United States Patent

[11] 3,582,198

| [72] | Inventor | Herbert Reinsch<br>Stuttgart, Germany |
|---|---|---|
| [21] | Appl. No. | 728,996 |
| [22] | Filed | May 14, 1968 |
| [45] | Patented | June 1, 1971 |
| [73] | Assignee | Robert Bosch Elektronik Und Photokino GmbH,<br>Stuttgart-Unterturkheim, Germany |
| [32] | Priority | May 27, 1967 |
| [33] | | Germany |
| [31] | | B-92754 |

[54] MOTION PICTURE CAMERA
10 Claims, 3 Drawing Figs.

[52] U.S. Cl. ................................................ 352/91,
352/175, 352/217
[51] Int. Cl. ..................................................... G03b 1/62
[50] Field of Search ............................................ 352/175,
92, 217

[56] References Cited
UNITED STATES PATENTS

| 3,425,776 | 2/1969 | Mayr et al. | 352/175 |
| 3,384,437 | 5/1968 | Winkler et al. | 352/124 |
| 3,246,944 | 4/1966 | Winkler | 352/91 |
| 2,955,510 | 10/1960 | Heinz | 352/217X |
| 2,556,770 | 6/1951 | Moore | 352/91 |
| 2,194,158 | 3/1940 | Adams | 352/175 |

FOREIGN PATENTS

| 1,136,897 | 5/1957 | France | 352/91 |

*Primary Examiner*—Samuel S. Matthews
*Assistant Examiner*—Michael Harris
*Attorney*—Michael S. Striker ABSTRACT: A motion picture camera wherein the film transporting mechanism comprises a reversible electric motor which also drives the shutter and a motion transmitting pin for the takeup reel of a magazine in the housing of the camera. A two-armed actuating lever is pivotable by hand to arrest the pin and to simultaneously start a timer which stops the motor with a predetermined delay so that the film transporting mechanism withdraws from the supply reel of the magazine a predetermined length of film while the motor continues to run subsequent to pivoting of the lever. Such length of film can be transported backwards by the pulldown of the film transporting mechanism while the motor is caused to rotate in reverse for an interval of time which is determined by the timer and equals the duration of the aforementioned delay.

INVENTOR:
HERBERT REINSCH

INVENTOR:
HERBERT REINSCH

MOTION PICTURE CAMERA

CROSS-REFERENCE TO RELATED APPLICATION

The motion picture camera of the present invention constitutes an improvement over and a further development of cameras disclosed in the copending application Ser. No. 701,280 filed Jan. 29, 1968 by Hansjoerg Braun and assigned to the same assignee.

BACKGROUND OF THE INVENTION

The present invention relates to motion picture cameras in general, and more particularly to improvements in motion picture cameras which are provided with means for making exposures with fadeout and fade-in transition. Still more particularly, the invention relates to improvements in motion picture cameras for use with magazines wherein the takeup reel for motion picture film can rotate only in a sense to collect exposed film and wherein the film transporting mechanism includes a reversible motor, preferably a reversible electric motor.

As disclosed in the aforementioned copending application of Braun, the magazine for motion picture film can be designed in such a way that it can accommodate a length of film which is withdrawn from the supply reel but is not convoluted on the takeup reel. Such length of film can be transported in reverse direction to be exposed again in order to produce a fade-in effect. The fadeout effect is produced during transport of such length of film in forward direction, i.e., while the takeup reel is at a standstill. In other words, a length of film can be exposed first with a fadeout transition and thereupon with a fade-in transition so that images of fresh scene or subject are superimposed upon the images of a preceding scene or subject.

SUMMARY OF THE INVENTION

It is an object of the present invention to provide a motion picture camera wherein the film transporting mechanism is automatically arrested when the transport of a predetermined length of film in forward direction is completed while the takeup reel of the magazine is at a standstill.

Another object of the invention is to provide the motion picture camera with simple, compact and inexpensive actuating means which can effect stoppage of the takeup reel and delayed automatic stoppage of the film transporting mechanism to insure that the magazine accommodates a portion of film which is not convoluted on the takeup reel or the supply reel and is of such length that it can be accommodated in the magazine without any damage thereto but is long enough to insure satisfactory fadeout and/or fade-in transition.

A further object of the invention is to provide the motion picture camera with a timer which can automatically arrest the film transporting mechanism during operation in forward or in reverse to withdraw a predetermined length of film from the supply reel while the takeup reel is idle and to thereupon return the same length of film to a position in which it can be reexposed with fade-in transition.

An additional object of the invention is to provide a motion picture camera wherein a single manipulation suffices to arrest the takeup reel, to start the fading mechanism in order to produce a fadeout transition, and to simultaneously start a timer which automatically arrests the film transporting mechanism when a predetermined length of film is withdrawn from the supply reel.

A concomitant object of the invention is to provide a motion picture camera wherein the exposure with fade-in transition may be superimposed upon or follower exposures with fadeout transition.

The camera comprises a housing which can accommodate magazines of the type having takeup means rotatable in a single direction to thereby collect exposed film, film transporting means including motor means mounted in the housing, rotary motion transmitting means mounted in the housing and arranged to engage the takeup means of a magazine which is properly inserted into the housing, a power train connecting the motor means with the motion transmitting means and including friction clutch means permitting operation of the motor means while the motion transmitting means is held against rotation so that the film transporting means can transport the film forwardly or in reverse while the takeup means is at a standstill, timer means actuatable to automatically arrest the motor means with a predetermined delay to thereby interrupt the transport of film, blocking means actuatable to hold the motion transmitting means against rotation while the motor means continues to operate, and common actuating means for the blocking means and timer means. The actuating means may comprise a two-armed lever which is pivotable to an operative position in which it causes the blocking means to hold the motion transmitting means against rotation and in which it simultaneously triggers the operation of the timer means to allow the film transporting means to withdraw a predetermined length of film from the supply reel of the magazine while the takeup means is at a standstill and to thus cause the predetermined length of film to form a loop which is accommodated in the magazine without being convoluted on the supply reel and/or takeup means.

An operating means is provided to start the motor means in reverse while the blocking means continues to hold the takeup means against rotation whereby the actuating means again actuates the timer means to insure that the latter automatically arrests the motor means when the transport of the predetermined length of film in reverse is completed so that such length of film can be exposed again but with a fade-in transition. Exposure with fadeout transition can be made while the film transporting means withdraws film from the supply reel and while the takeup means is held against rotation by the blocking means.

The novel features which are considered as characteristic of the invention are set forth in particular in the appended claims. The improved motion picture camera itself, however, both as to its construction and its mode of operation, together with additional features and advantages thereof, will be best understood upon perusal of the following detailed description of a specific embodiment with reference to the accompanying drawing.

DESCRIPTION OF THE PREFERRED EMBODIMENTS

Figure 1:
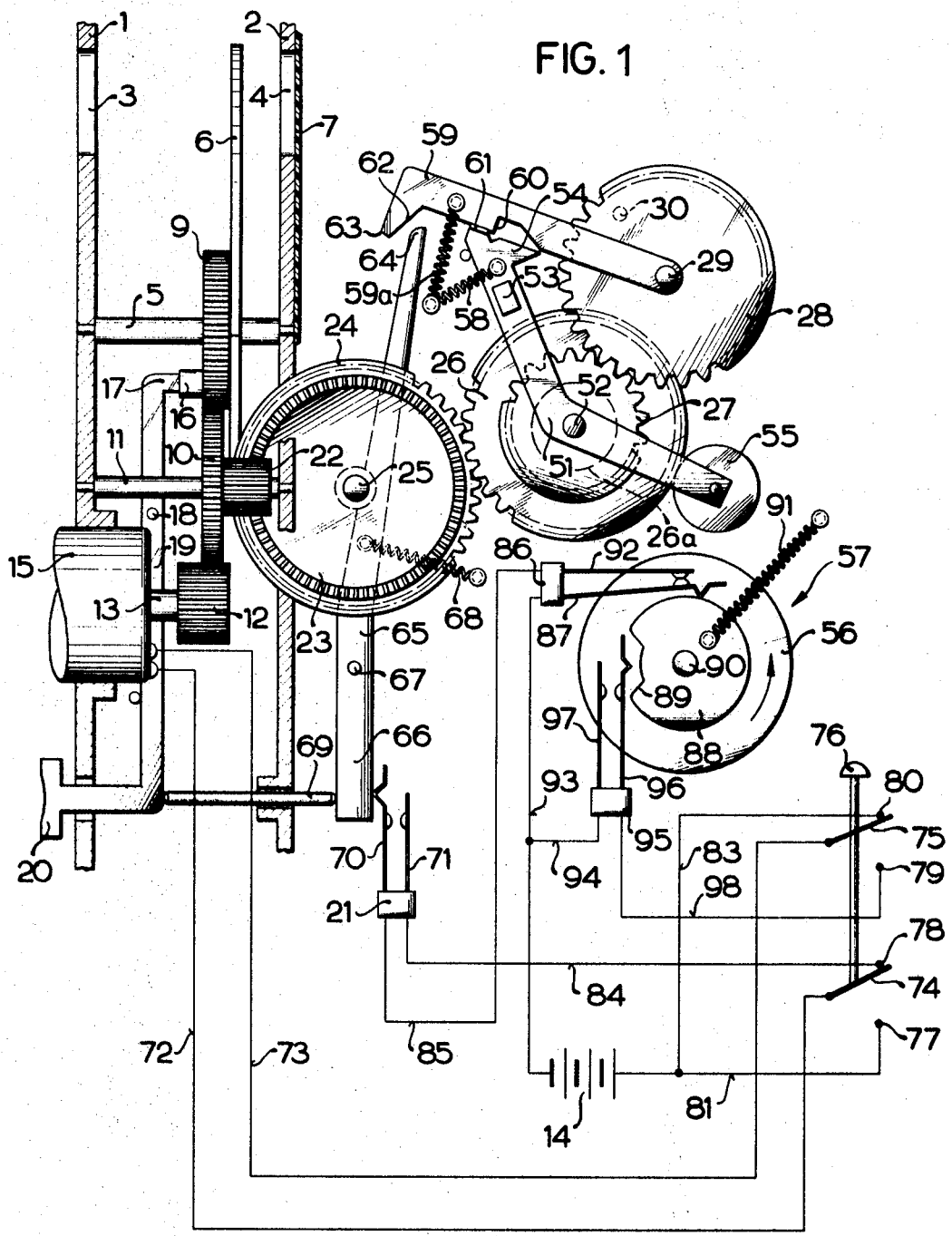
FIG. 1 is a fragmentary partly diagrammatic and partly sectional view of a motion picture camera which embodies the invention.

FIG. 1 illustrates a portion of a motion picture camera wherein the film transporting means comprises a reversible electric motor 15. The housing of the camera comprises two parallel supporting walls 1,2 which are installed in the front part of the housing and are provided with registering light-admitting openings 3 and 4. A disc-shaped shutter 6 is mounted on a shaft 5 between the walls 1, 2 to intermittently expose the rear opening 4 to scene light in response to rotation of the shaft 5. The motion picture film 7 is guided along a path which extends directly or closely behind the opening 4 in the wall 2. The operative connection between the shutter 6 and the motor 15 comprises a gear 9 which is fixedly mounted on the shaft 5 and meshes with an intermediate gear 10 mounted on a shaft 11. The gear 10 is driven by a pinion 12 which is affixed to the output shaft 13 of the motor 15, the latter being mounted on the front wall 1. The gear 9 has an axially parallel projection 16 which cooperates with the upper are 17 of a two-armed release lever 19 pivotable on a pin 18 carried by the housing of the camera. The lower arm 20 of the release lever 19 constitutes a shutter release trigger and a portion thereof extends forwardly through an opening in the wall 1 so that it is accessible to the operator of the camera. When the arm 20 is pivoted in a counterclockwise direction, the arm 17 moves away from the path of the projection 16 on the gear 9 and the shutter 6 can rotate because the arm 20 simultaneously completes the circuit of the motor 15 causing closing a master switch 21.

The shaft 11 for the intermediate gear 10 carries a pinion 22 which meshes with a ring gear or face gear 23; the latter is integral with a spur gear 24 which drives a gear train 26, 27, 28. The gear 28 carries an eccentric motion transmitting pin 30 which engages a projection 33 of a takeup reel 31 shown in FIGS. 2 and 3. The gears 26, 27 are coaxially mounted on a shaft 52 and the gear 27 can receive torque from the gear 26 by way of a conventional friction clutch 26a which is indicated by a broken-line circle. The parts 12, 10, 22—26, 26a, 27 and 28 together constitute a power train between the output shaft 13 of the motor 15 and the motion transmitting pin 30. The friction clutch 26a of this power train enables the motor 15 to rotate the gears 12, 10, 9, 22—26 while the gears 27, 28 pin 30 and the takeup reel 31 are held against rotation.

Figure 2:
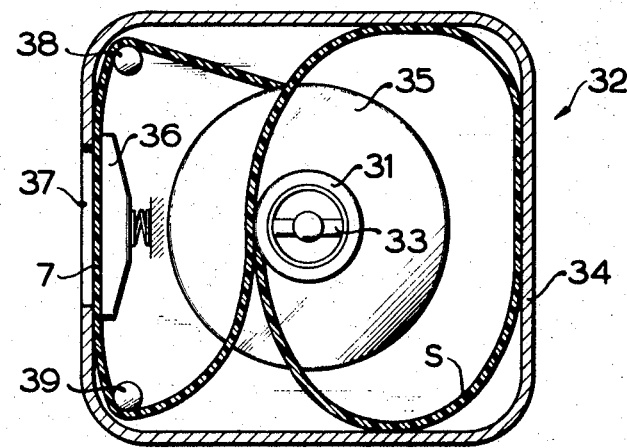
FIG. 2 is a sectional view of a magazine which can be utilized in the camera of FIG. 1, a length of motion picture film being shown in a position it assumes upon completed exposure with fadeout transition.
Figure 3:
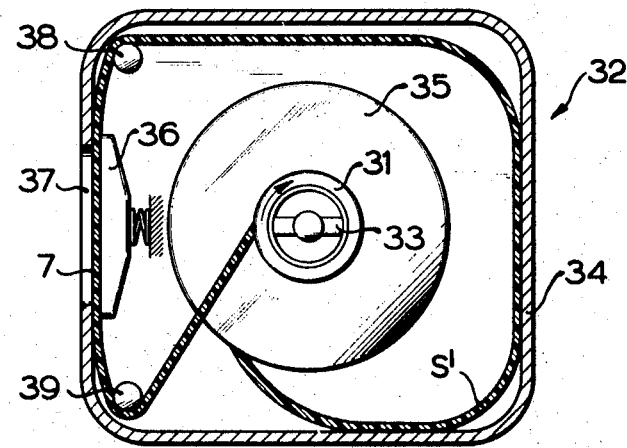
FIG. 3 is a similar sectional view of the magazine but showing the length of film in a position it assumes upon completed transport in reverse direction.

Referring now to FIGS. 2 and 3, there is shown a container or magazine 32 for motion picture film 7. This magazine has a substantially closed housing or casing 34 which defines a chamber for the aforementioned reel 31 and its core 33. The chamber of the casing 34 further accommodates a source of film 7 here shown as a supply reel 35 which is coaxial with the takeup reel 31. The reel 31 is held against rotation in a counterclockwise direction as viewed in FIGS. 2 and 3. The device which prevents such counterclockwise rotation of the reel 31 is of conventional design and is not shown in the drawing.

The front panel of the casing 34 has a window 37 located in front of a spring-biased pressure plate 36. When the magazine 32 is properly inserted into the housing of the camera shown in FIG. 1, the window 37 of the casing 34 is located directly behind and registers with the opening 4 in the wall 2. The film 7 is guided by rolls 38, 39 and is arranged to travel from the supply reel 35, over the guide roll 38, between the pressure plate 36 and window 37, over the guide roll 39 and to the takeup reel 31. The motor 15 drives a conventional pulldown (not shown) having a claw which can transport the film by entering into perforations provided in one or both marginal portions of the film. A pulldown mechanism capable of being driven by a reversible electric motor to transport motion picture film forwardly and backwards is disclosed to example in the U.S. Pat. No. 3,081,013.

The aforementioned shaft 52 for the gears 26, 27 and friction clutch 26a supports a two-armed actuating lever 51 having a manually operated portion or knob 53 which is accessible to the user of the camera. The upwardly extending arm of the lever 51 carries a blocking projection or tooth 54 which can arrest the motion transmitting pin 30 on the gear 28 to thus arrest the takeup reel 31 when it engages with the teeth of the gear 28. The other arm of the lever 51 carries a rotary friction wheel 55 which engages a complementary friction wheel 56 when the blocking tooth 54 engages and arrests the gear 28 for the motion transmitting pin 30. The friction wheel 56 forms part of a timer mechanism 57 which can automatically arrest the motor 15 after a predetermined interval of time. The friction wheel 55 engages with and is rotated by the teeth of the gear 26. The lever 51 is biased to inoperative position (shown in FIG. 1) by a helical spring 58 which tends to move the blocking tooth 54 away from the gear 28 and to thus maintain the actuating lever in the illustrated inoperative position. The friction wheel 55 is then disengaged from the friction wheel 56.

The shaft 29 of the gear 28 carries a one-armed locking lever 59 which can cooperate with the actuating lever 51 to hold the latter in an operative position in which the tooth 54 blocks the gear 28 and the wheel 55 drives the wheel 56. As shown in FIG. 1, the locking lever 59 has a stop shoulder 60 which engages a bent over projection or lug 61 of the actuating lever 51 when the latter is rotated by hand upon completed filming of a scene. The locking lever 59 is biased by a spring 59a so that it tends to turn in a counterclockwise direction. The arm 20 can pivot a disengaging lever 65 which is pivotable on a fixed pin 67 and has two arms 64, 66. The arm 64 constitutes a follower and can engage one of two cam faces 62, 63 at the free end of the locking lover 59. A spring 68 biases the disengaging lever 65 in a clockwise direction so that the arm 66 bears against a reciprocable pin 69 which in turn bears against the release lever 19. The arm 66 serves as a trip for the master switch 21. The latter has two contacts 70, 71 and the contact 70 tends to move away from the contact 71 to thus open the master switch.

When the arm 20 is depressed to pivot the release lever 19 in a counterclockwise direction, the pin 69 causes the disengaging lever 65 to turn in the same direction about the axis of the pin 67 and to close the master switch 21. The upper arm or follower 64 of the disengaging lever 65 travels along the face 62 of the locking lever 59 and pivots the latter in a clockwise direction. The arm 64 then moves beyond the face 62 and the spring 59a is free to pivot the lever 59 in a clockwise direction. If the arm 20 is thereupon released, the spring 68 contracts and turns the disengaging lever 65 to the illustrated position whereby the arm 64 slides over the inclined cam face 63 without pivoting the lever 59.

The circuit of the motor 15 comprises two conductors 72, 73 which are respectively connected with movable contacts 74, 75. These contacts are connected with a spring-biased operating knob 76 and are respectively movable into engagement with one of two fixed contacts 77, 78 and 79, 80. The contact 77 is connected with one pole of a battery 14 by a conductor 81. The contact 78 is connected with one terminal of the master switch 21 by a conductor 84. The contact 80 is connected with the one pole of the battery 14 by a conductor 83, preferably by way of the conductor 81. The other terminal of the master switch 21 is connected with one terminal of a first interrupter switch 86 by a conductor 85. The movable contact 87 of the switch 86 bears against the periphery of a cam 88 which is rigid with the shaft 90 of the friction wheel 56. The periphery of the cam 88 has a recess or notch 89 which allows the interrupter switch 86 to open when it receives the tip of the movable contact 87. The cam 88 is rigid with the friction wheel 56 and is biased by a helical spring 91 which tends to maintain it in a predetermined neutral position shown in FIG. 1. In such neutral position of the cam 88, the interrupter switch 86 is closed because its movable contact 87 bears against a fixed contact 92. The cam 88, shaft 90 and spring 91 form part of the timer mechanism 57.

A conductor 93 connects the other terminal of the interrupter switch 86 with the other pole of the battery 14. The conductor 93 is connected with one terminal of a second interrupter switch 95 by a conductor 94. The switch 95 comprises a fixed contact 97 and a movable contact 96 which tends to move away from the contact 97 and can open the switch 95 when its tip extends into the notch 89 of the cam 88. In other words, the switch 95 is opened in the neutral or starting angular position of the cam 88. A conductor 98 connects the other terminal of the second interrupter switch 95 with the aforementioned fixed contact 79.

The just described circuitry comprises two circuits for the motor 15 to drive the motor in a first and in a second direction depending upon whether the operator depresses the arm 20 or the knob 76. The interrupter switch 86 is closed when the motor 15 rotates in a sense to transport the film 7 in a forward direction, and the interrupter switch 95 is closed when the motor 15 is caused to rotate in the opposite direction to transport the film 7 backwards. When the motion transmitting pin 30 is arrested and the cam 88 rotates in a counterclockwise direction, the motor 15 is arrested as soon as the notch 89 moves into registry with the tip of the movable contact 87 in the first interrupter switch 86. The movable contact 96 of the second interrupter switch 95 then engages the periphery of the cam 88 and is biased against the contact 97.

If the user depresses the operating knob 76, the polarity of the motor 15 is reversed and the output shaft 13 is caused to rotate in the opposite direction. The aforementioned pulldown of the film transporting means then moves the film 7 backwards. The friction wheel 55 drives the wheel 56 and cam 88 in a clockwise direction so that, after elapse of a predetermined interval of time, the second interrupter switch 95 opens and arrests the motor 15.

The operation is as follows:

In order to start a series of exposures, the operator depresses the arm 20 of the release lever 19. The arm 17 of the lever 19 then moves away from the projection 16 of the gear 9 to thus release the shutter 6. The pin 69 pivots the disengaging lever 65 so that the latter's arm 66 closes the master switch 21. The circuit of the motor 15 and battery 14 is then completed by way of the conductor 83, contacts 80, 75, conductors 73, 72, contacts 74, 78, conductor 84, master switch 21, conductor 85, interrupter switch 86 and conductor 93. The motor 15 is running in a sense to effect forward transport of film 7 in the magazine 32. At the same time, the gears 12, 10, 9 drive the shaft 5 and shutter 6. The power train including the gears 12, 10, 22, 23, 24, 26, clutch 26a and gears 27, 28 drives the motion transmitting pin 30 which rotates the takeup reel 31 so that the film which is being paid out by the supply reel 35 is collected by the takeup reel. The reel 35 rotates in response to pull exerted upon the film 7 by the claw pulldown.

If the operator pivots the actuating lever 51 by way of the knob 53 while the motor 15 is running in forward direction, i.e. while the arm 20 of the release lever 19 is depressed, the actuating lever pivots in a clockwise direction and its blocking tooth 54 engages the teeth of the gear 28 to arrest this gear and the motion transmitting pin 30, i.e., the takeup reel 31 comes to a halt. At the same time, the friction wheel 55 (which is constantly driven by the gear 26) moves into engagement with the friction wheel 56 of the timer mechanism 57 so that the wheel 56 rotates in a counterclockwise direction. The actuating lever 51 can be released because its lug 61 engages with and is held by the stop shoulder 60 of the locking lever 59 which is permanently biased by the spring 59a so that it tends to turn in a counterclockwise direction. The blocking tooth 54 holds the gears 27, 28 and motion transmitting pin 30 against rotation; however, the gear 26 continues to rotate due to the presence of friction clutch 26a so that the friction wheel 55 drives the wheel 56. The pulldown continues to draw the film 7 off the supply reel 35 and past the window 37 in a downward direction, as viewed in FIG. 2. Since the core 33 of the takeup reel 31 is at a standstill, the thus withdrawn length of film 7 forms in the casing 34 a loop S which is shown in FIG. 2.

The wheel 56 rotates the shaft 90 and cam 88 so that the notch 89 approaches and ultimately accommodates the tip of the movable contact 87 in the first interrupter switch 86. This takes place after the cam 88 completes about three-fourths of a full revolution in a counterclockwise direction. The motor 15 is then arrested and the second interrupter switch 95 is closed because its movable contact 96 bears against the periphery of the cam 88. The rotational speed of the friction wheel 56 and cam 88 is selected in such a way that the pulldown can withdraw from the supply reel 35 a predetermined length of film 7 (loop S) before the interrupter switch 86 opens to arrest the motor 15. This length of film 7 suffices for exposures with fadeout or fade-in transition. It is important to insure that the pulldown invariably withdraws from the supply reel 35 the same length of film 7 during the interval beginning on engagement between the blocking tooth 54 and gear 28 and terminating with opening of the first interrupter switch 86. Such length of film 7 should not exceed the capacity of the casing 34, i.e., the interior of the casing 34 should accommodate the loop S without any damage to the film.

The mechanism which effects a fadeout or a fade-in transition is known in the art and forms no part of the present invention; therefore, this mechanism has not been shown in the drawing. It is preferred to use a fully automatic fading mechanism which can be started by the actuating lever 51 in response to movement of the blocking tooth 54 into engagement with the teeth of the gear 28. Thus, a fadeout transition can be carried out while the friction wheel 55 drives the wheel 56 and such fadeout transition is completed when the timer mechanism 57 opens the interrupter switch 86 to arrest the motor 1.

The operator moves his finger away from the arm 20 of the release lever 19 when the motor 15 is arrested in response to opening of the interrupter switch 86. The disengaging lever 65 then returns to the illustrated position under the action of its spring 68 and permits the master switch 21 to open. The upper arm or follower 64 of the disengaging lever 65 slides over the inclined cam face 63 of the locking lever 59 without disengaging the shoulder 60 from the projection 61, and the arm 64 then returns behind the cam face 62.

In order to transport the loop S backwards, i.e., past the window 37 and toward and over the guide roll 38, the operator simply depresses the operating knob 76 so as to move the contacts 74, 75 into engagement with the fixed contacts 77, 79. The circuit of the motor 15 and battery 14 is then completed by way of conductor 81, contacts 74, 77, conductors 72, 73, contacts 75, 79, conductor 98, interrupter switch 95 and conductors 94, 93. The motor 15 rotates in a sense to operate the pulldown in reverse and the pulldown transports the film 7 upwardly, as viewed in FIG. 2, so that the loop S is converted into a loop S' (FIG. 3). The takeup reel 31 is at a standstill because the blocking tooth 54 of the actuating lever 51 remains in engagement with the gear 28 and holds the motion transmitting pin 30 against rotation about the shaft 29. The supply reel 35 is also at a standstill.

When the operating knob 76 is depressed, the friction wheel 55 rotates the wheel 56 and cam 88 in a clockwise direction so that the cam 88 returns to the angular position shown in FIG. 1 after it completes three-fourths of a revolution. This opens the interrupter switch 95 and the motor 15 is arrested. The interrupter switch 86 closes shortly after the user depresses the operating knob 76. In the next step, the operator depresses the arm 20 to close the master switch 21 and to start the motor 15 in forward direction. The shutter 6 rotates. During depression of the arm 20, the pin 69 pivots the disengaging lever 65 in a counterclockwise direction and the arm or follower 64 slides along the cam face 62 to disengage the locking lever 59 from the actuating lever 51 whereby the latter turns in a counterclockwise direction and moves its blocking tooth 54 away from the gear 28. The motion transmitting pin 30 is then free to rotate and the friction wheel 55 is disengaged from the friction wheel 56, i.e., the timer mechanism 57 is idle. The interrupter switch 86 remains closed and the interrupter switch 95 remains open. The pulldown is operated in a sense to transport the loop S' (FIG. 3) past the window 37 and the takeup reel 31 is rotated by the motion transmitting pin 30 so that it collects the loop S'. The aforementioned fading mechanism is set in operation in response to movement of the blocking tooth 54 away from the gear 28 and effects a fade-in transition by gradually opening the diaphragm so that the film 7 is exposed in a normal way as soon as the entire loop S' is collected on the core 33 of the takeup reel 31.

If the user wishes to produce a fadeout and a fade-in transition without rewinding of the film 7 (i.e., without conversion of the loop S into the loop S'), the arm 20 is released after opening of the interrupter switch 86. The arm 20 is then depressed again so that the disengaging lever 65 closes the master switch 21 and its arm or follower 64 lifts the locking lever 59 away from the actuating lever 51. The actuating lever 51 is pivoted by its spring 58 and moves the friction wheel 55 away from the wheel 56 so that the spring 91 is free to contract and to return the cam 88 to the neutral position shown in FIG. 1. This closed the interrupter switch 86 and opens the interrupter switch 95. The motor 15 rotates in a forward direction and the diaphragm is opened gradually by the fading mechanism so that the length of film following the loop S is exposed with fade-in transition. The loop S is gradually collected by the takeup reel 31 because the latter's speed is normally somewhat higher than the speed at which the pulldown draws the film off the supply reel 35. This is a customary procedure to eliminate slack in motion picture film between the supply and takeup reels. While the loop S is being collected by the reel 31, the friction clutch 26a causes the gear 26 to rotate at the speed of the gear 26; however, when the loop S is fully collected by the reel 31, the friction clutch 26a permits the gear 26 to slip with reference to the gear 27 so that the film 7 is taut in the region between the pulldown and the reel 31.

An important advantage of my camera is that a single actuating means (i.e., the lever 51 and its knob 53) suffices to actuate the blocking tooth 54 by moving the latter into engagement with the teeth of the gear 28 for the motion transmitting pin 30 to simultaneously actuate the timer mechanism 57 by causing the driven friction wheel 55 to engage with and to rotate the wheel 56 and cam 88. In this way, the pulldown of the film transporting means (which includes the motor 15) invariably removes from the takeup reel 35 a predetermined length (S) of film 7 while the motor 15 continues to run during the interval required to move the cam 88 through an angle of 270°. Thus, that length of film which is exposed with fadeout transition is always the same because the takeup reel 31 is arrested simultaneously with actuation of the timer mechanism. The camera can be handled with ease because a single manipulation of the knob 53 suffices to move the actuating lever 51 from the illustrated inoperative position to operative position in which the blocking tooth 54 holds the gear 28 and motion transmitting pin 30 against rotation and in which the friction wheel 55 starts the operation of the timer mechanism 57. This is important because the operator of the camera must pivot the actuating lever 51 while pressing the arm 20 of the release lever 19 and while observing the scene through the viewfinder. The length of the loop S is invariably selected in such a way that the loop can be accommodated in the casing 34 without any damage to the film.

The spring 58 tends to return the actuating lever 51 to the inoperative position of FIG. 1. The locking lever 59 holds the actuating lever 51 in operating position if the lever 51 is moved to such position while the user continues to press the arm 20 of the release lever 19. The disengaging lever 65 disengages the locking lever 59 from the actuating lever 51 when the arm 20 is depressed again. In other words, the lever 65 cannot disengage the lever 59 from the lever 51 if the arm 20 is released while the projection 61 engages the stop shoulder 60, but the spring 58 is free to contract in response to next-following depression of the arm 20. This insures that the actuating lever 51 automatically returns to inoperative position at the start of exposures with fade-in transition, irrespective of whether the exposures with fade-in transition are superimposed upon or follow the exposures with fadeout transition, i.e., irrespective of whether the loop S is exposed twice in a row (first with fadeout and then with fade-in transition) or whether the loop S is exposed with fadeout transition and the next-following portion of film 7 is exposed with fade-in transition.

Without further analysis, the foregoing will so fully reveal the gist of the present invention that others can, by applying current knowledge, readily adapt it for various applications without omitting features which fairly constitute essential characteristics of the generic and specific aspects of my contribution to the art and, therefore, such adaptations should and are intended to be comprehended within the meaning and range of equivalence of the claims.

What I claim as new and desired to be protected by Letters Patent is set forth in the appended claims.

1. In a motion picture camera, a combination comprising a housing; a film magazine removably received in said housing and having takeup means rotatable only in a given direction to thereby collect exposed film and supply means for paying out unexposed film, said magazine defining a chamber for accommodation of film which is being paid out by said supply means while said takeup means is at a standstill; film transporting means including motor means mounted in said housing; rotary motion transmitting means mounted in said housing and engaging with the takeup means of said magazine; a power train connecting said motor means with said motion transmitting means and including clutch means for enabling said motor means to operate while said motion transmitting means is held against rotation whereby said film transporting means draws film from said supply means while said takeup means is at a standstill and the thus withdrawn film accumulates in said chamber; timer means for automatically arresting said motor means with a predetermined delay to thereby interrupt the transport of film and to thus terminate the accumulation of uncollected film in said chamber; blocking means actuable to hold said motion transmitting means against rotation while said motor means is in operation; and common actuating means for said blocking means and said timer means.

2. A combination as defined in claim 1, wherein said actuating means is movable between an operative position in which it actuates said blocking means and said timer means and an inoperative position, and further comprising means for biasing said actuating means to inoperative position.

3. A combination as defined in claim 2, further comprising shutter means, an operative connection between said shutter means and said motor means, shutter release means operative to start said motor means and to simultaneously release said shutter means, and locking means for holding said actuating means in operative position between successive operations of said release means.

4. A combination as defined in claim 3, further comprising disengaging means for automatically disengaging said locking means from said actuating means in response to operation of said release means.

5. In a motion picture camera, a combination comprising a housing arranged to accommodate film magazines of the type having takeup means rotatable in a given direction to thereby collect exposed film; film transporting means including motor means mounted in said housing; rotary motion transmitting means mounted in said housing and arranged to engage with the takeup means of a magazine on insertion of such magazine into said housing; a power train connecting said motor means with said motion transmitting means and including clutch means permitting operation of said motor means while said motion transmitting means is held against rotation; timer means actuatable to automatically arrest said motor means with a predetermined delay to thereby interrupt the transport of film; blocking means actuatable to hold said motion transmitting means against rotation while said motor means is in operation; common actuating means for said blocking means and said timer means, said actuating means being movable between an operative position in which it actuates said blocking means and said timer means an inoperative position; means for biasing said actuating means to inoperative position; shutter means; an operative connection between said shutter means and said motor means; shutter release means operative to start said motor means and to simultaneously release said shutter means; locking means for holding said actuating means in operative position between successive operations of said release means; and disengaging means for automatically disengaging said locking means from said actuating means in response to operation of said release means, said locking means comprising cam means and said disengaging means comprising follower means which can bypass said cam means in response to movement of said release means to an idle position but disengages said locking means from said actuating means by way of said cam means in response to operation of said release means.

6. In a motion picture camera, a combination comprising a housing arranged to accommodate film magazines of the type having takeup means rotatable in a given direction to thereby collect exposed film; film transporting means including motor means mounted in said housing; rotary motion transmitting means mounted in said housing and arranged to engage with the takeup means of a magazine on insertion of such magazine into said housing; a power train connecting said motor means with said motion transmitting mean and including clutch means permitting operation of said motor means while said motion transmitting means is held against rotation; timer means actuatable to automatically arrest said motor means with a predetermined delay to thereby interrupt the transport of film; blocking means actuatable to hold said motion transmitting means against rotation while said motor means is in operation; and common actuating means for said blocking means and said timer means, said actuating means comprising a lever pivotable about a predetermined axis and having a first arm provided with a wheel which receives torque from said power train and a second arm a portion of which constitutes said blocking means, said lever being pivotable by hand from an inoperative position to an operative position in which said wheel actuates said timer means and said blocking means holds said motion transmitting means.

7. A combination as defined in claim 6, wherein said timer means comprises a second wheel which is rotated by said first mentioned wheel in operative position of said lever and is arranged to effect stoppage of said motor means in response to rotation through a predetermined angle.

8. A combination as defined in claim 6, wherein said power train further comprises a gear which receives torque by way of said clutch means and rotates said motion transmitting means, said blocking means engaging with and holding said gear against rotation in response to movement of said lever to operative position.

9. A combination as defined in claim 8, wherein said power train further comprises a second gear which drives said clutch means and said wheel.

10. A combination as defined in claim 1, wherein said motor means is a reversible electric motor and wherein said timer means is arranged to set the motor for operation in reverse in response to stoppage of the motor with said delay, and further comprising operating means for starting said motor in reverse to transport the film in said chamber backwards during an interval corresponding to said delay.